April 30, 1935.  C. H. WEISKOPF  1,999,492
DAMPER
Filed Sept. 23, 1931  6 Sheets-Sheet 1
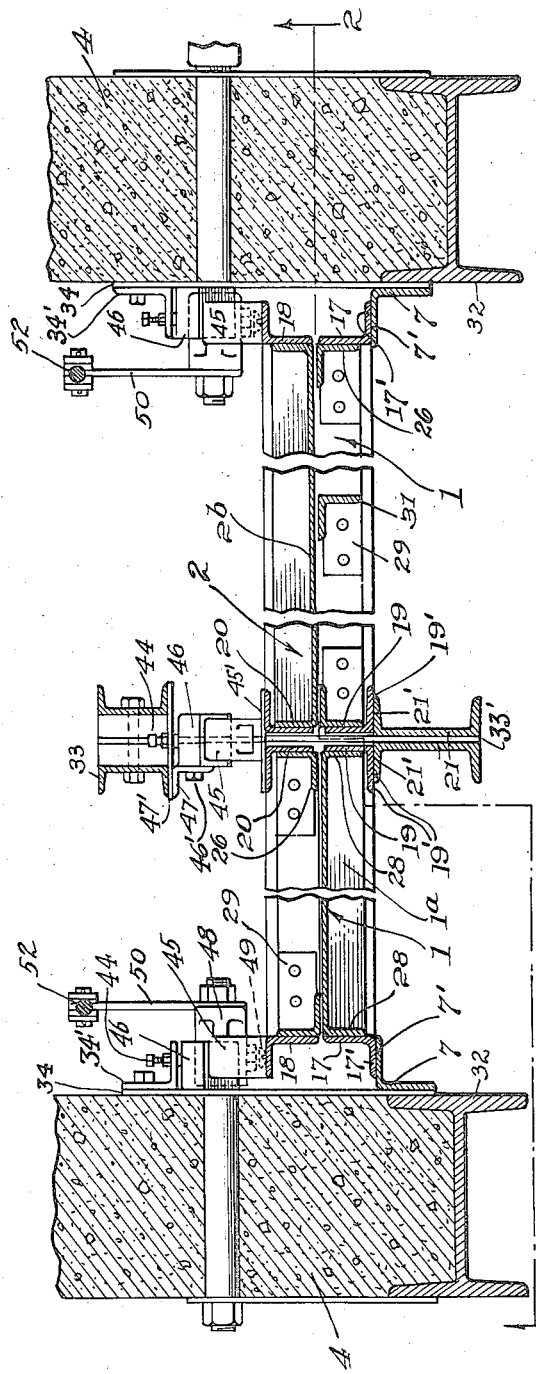

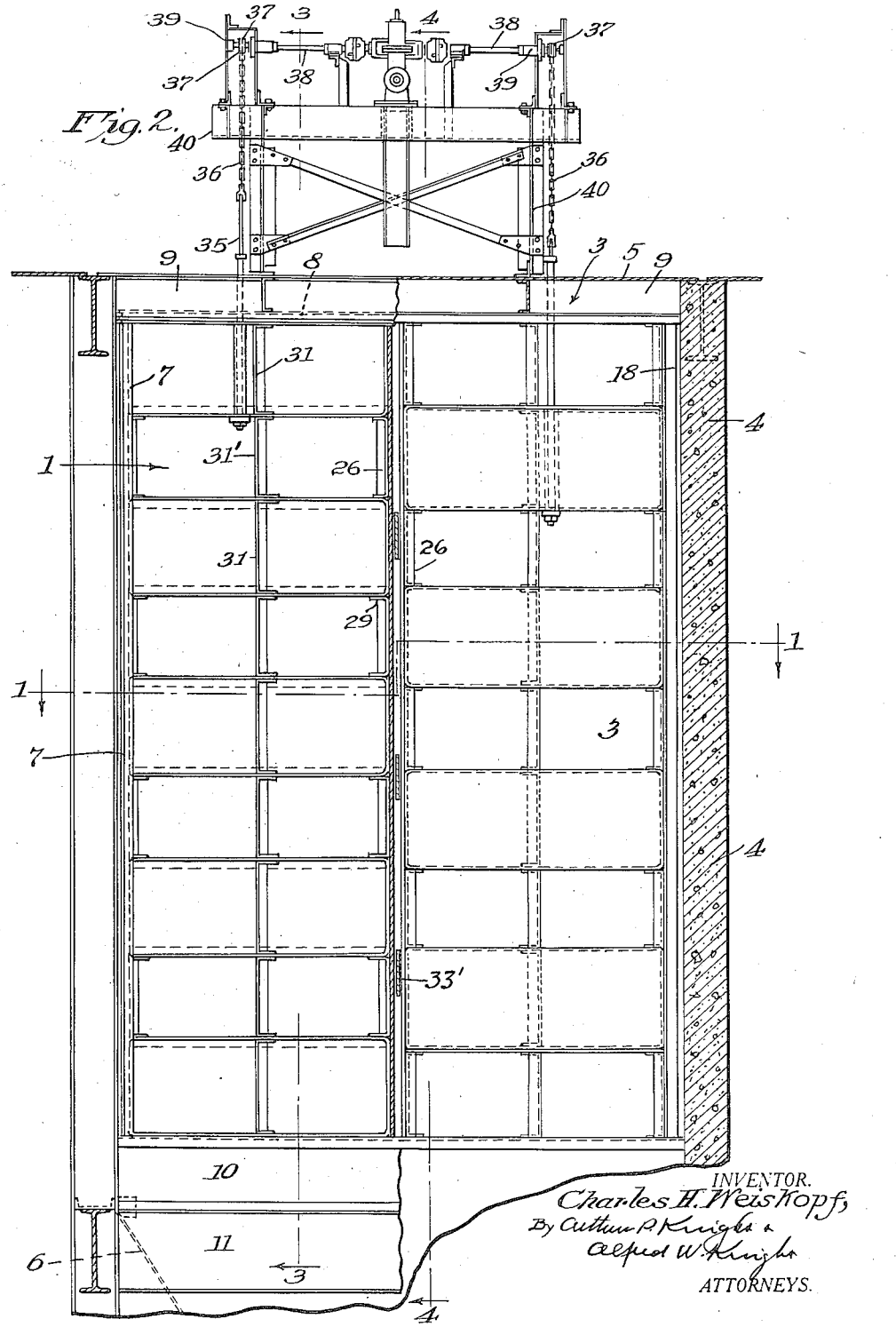

April 30, 1935.   C. H. WEISKOPF   1,999,492
DAMPER
Filed Sept. 23, 1931   6 Sheets-Sheet 3
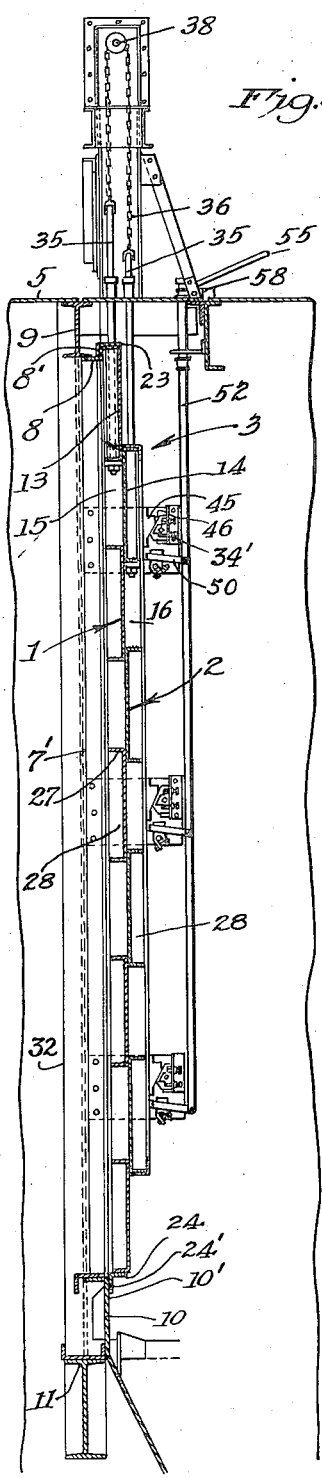
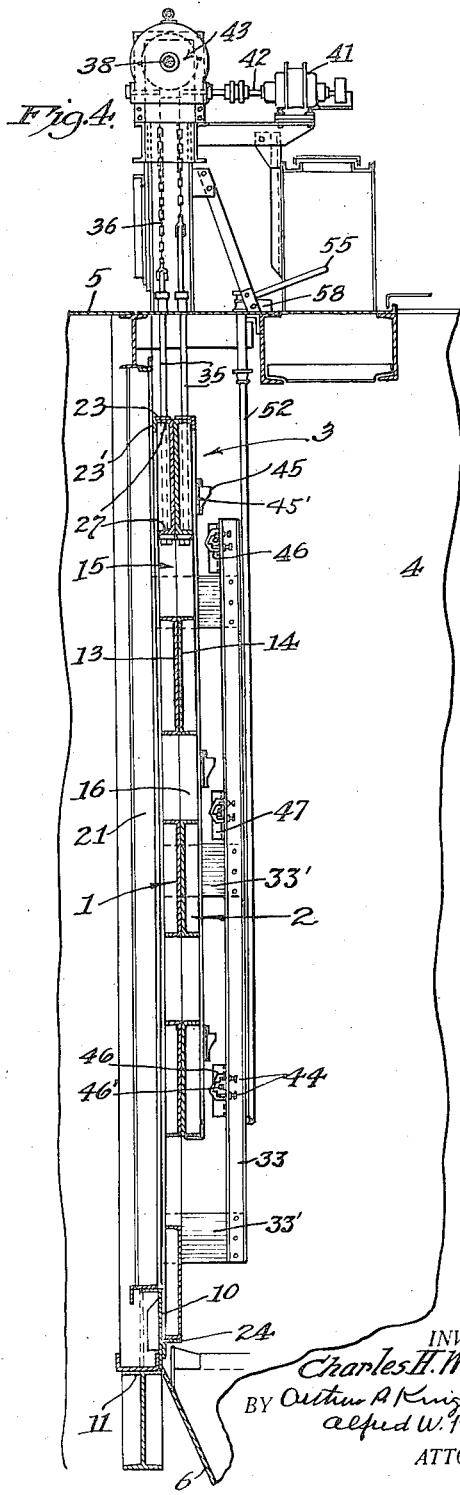
INVENTOR.
Charles H. Weiskopf,
BY Arthur A. Knight &
Alfred W. Knight
ATTORNEYS.

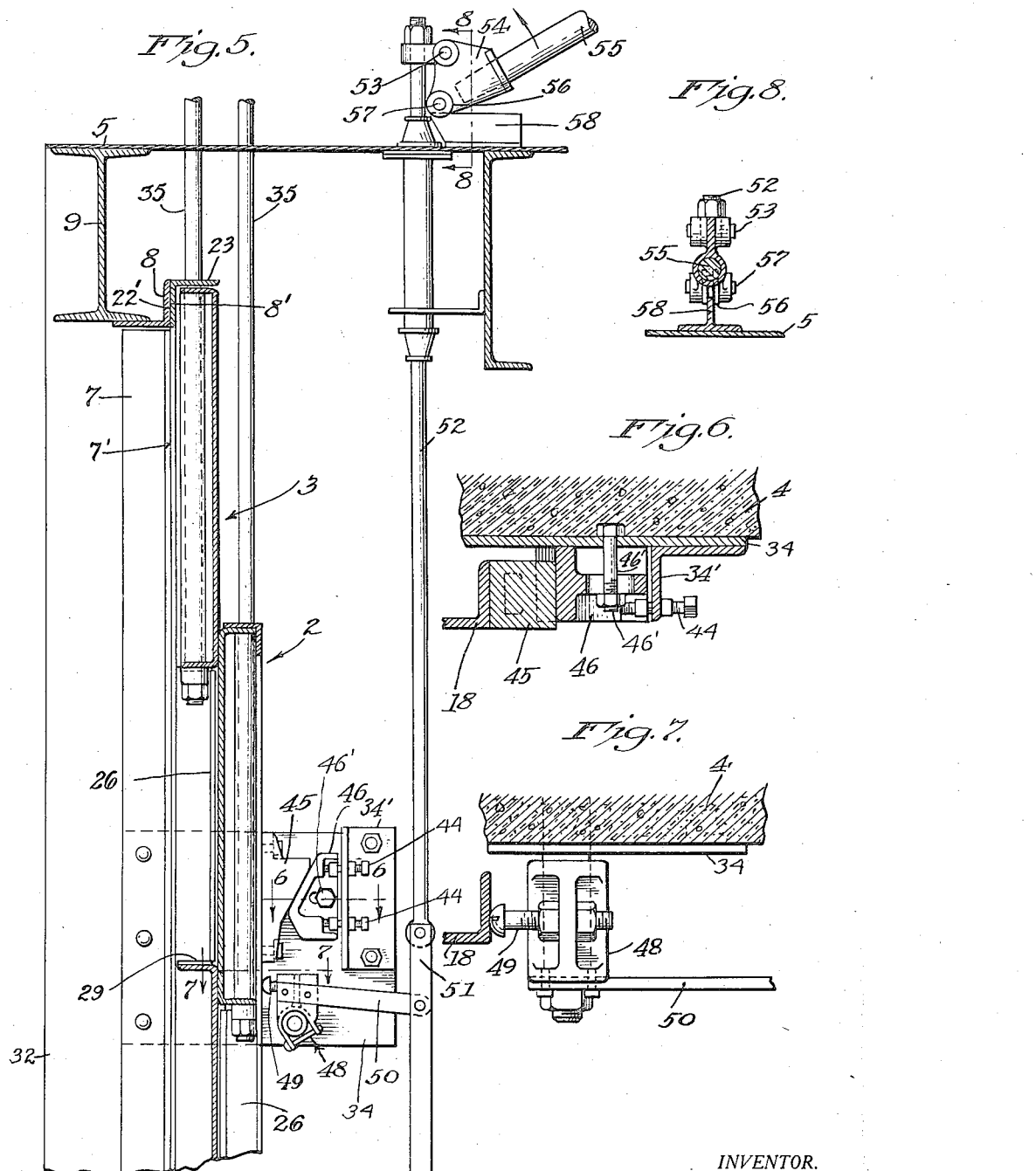

April 30, 1935.  C. H. WEISKOPF  1,999,492
DAMPER
Filed Sept. 23, 1931  6 Sheets-Sheet 5
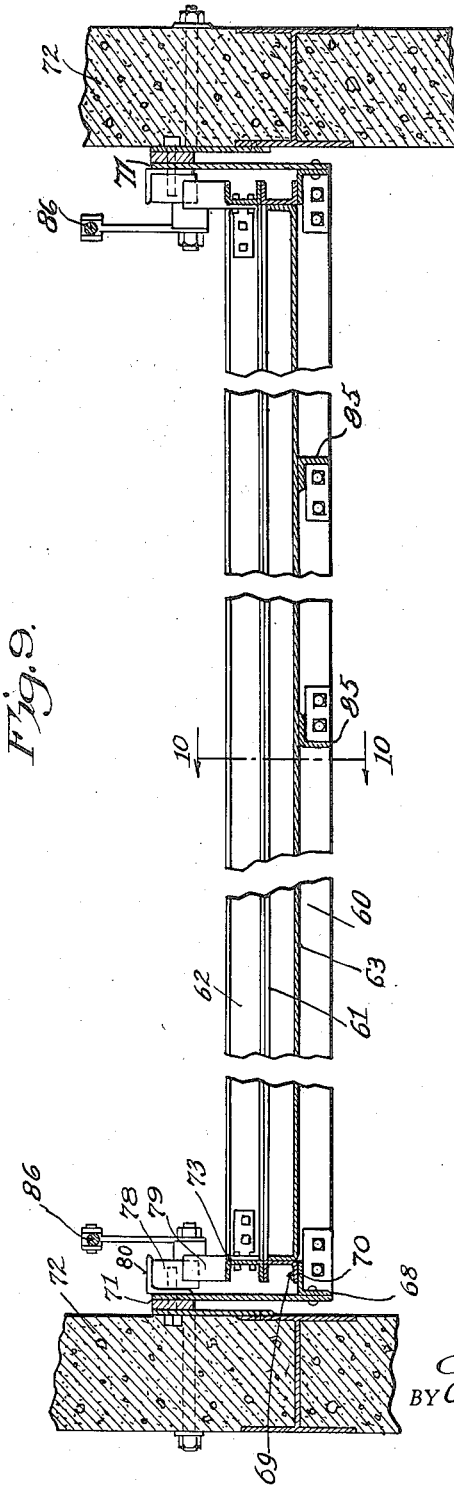
INVENTOR.
Charles H. Weiskopf,
BY Arthur P. Knight
Alfred W. Knight
ATTORNEYS.

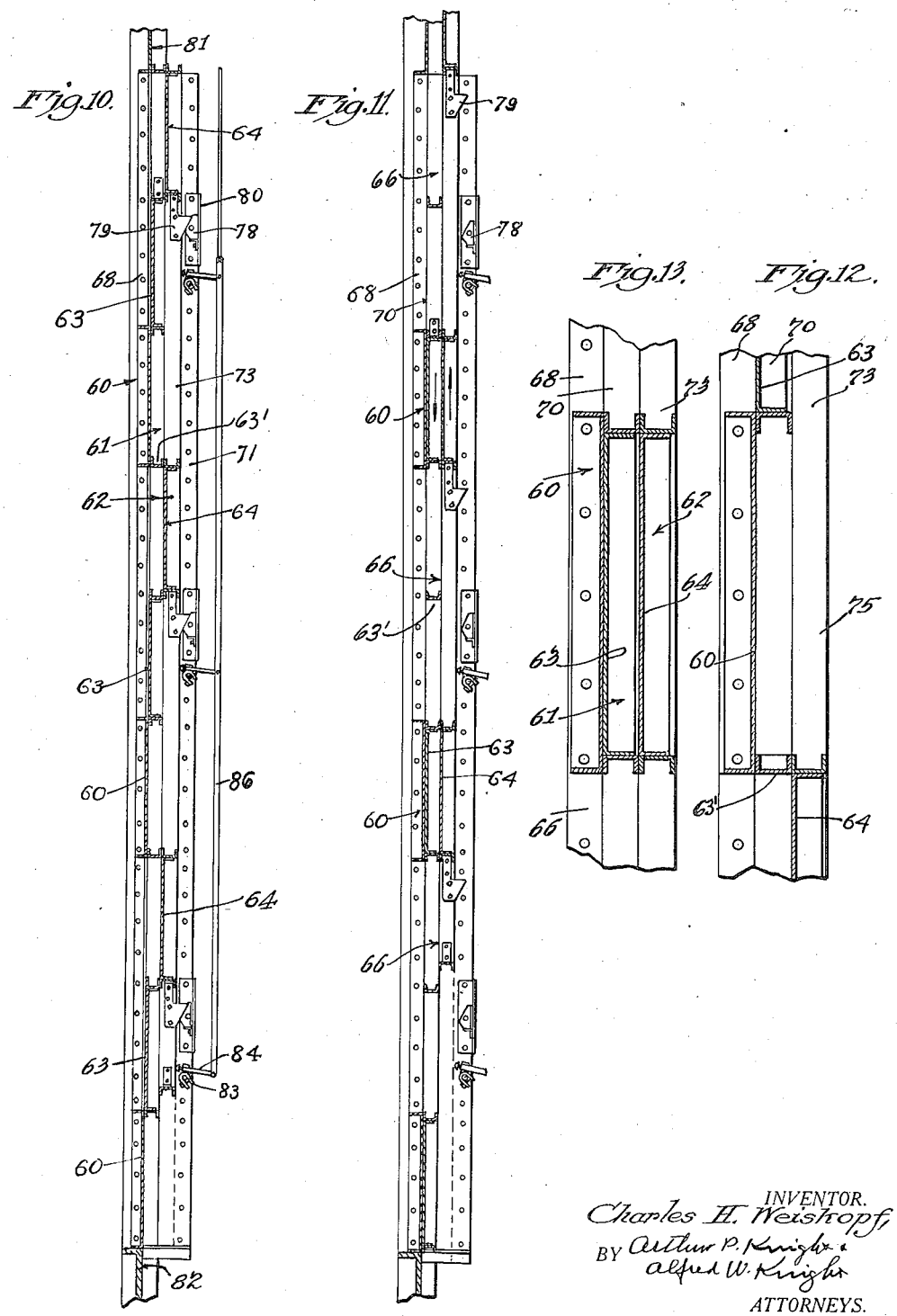

Patented Apr. 30, 1935

1,999,492

UNITED STATES PATENT OFFICE 1,999,492

DAMPER

Charles H. Weiskopf, Hawthorne, Calif., assignor to International Precipitation Company, Los Angeles, Calif., a corporation of California Application September 23, 1931, Serial No. 564,693

6 Claims. (Cl. 251—51)

This invention relates to dampers for controlling or shutting off gas passages or openings and is particularly applicable to the regulation and shutting off of gas flow in flues or similar passages. The damper may be used, however, for control of flow of any fluid.

The principal object of the invention is to provide a damper in which a minimum power expenditure is required for effecting operation of the damper to different positions. A particular object in this connection is to provide a damper comprising two movable damper members so mounted as to counterbalance one another and so constructed and operated that one of said damper members moves upwardly while the other moves downwardly, and that movement of the respective damper members upwardly or downwardly serves to variably open or close the passage in which said damper is mounted. A further object of the invention is to provide a damper in which a minimum amount of movement is required to move the damper from its full open position to closed position, so that any desired regulation or shutting off of the gas flow may be quickly effected.

A further object of the invention is to provide a damper construction comprising two movable damper members adapted to be moved to open or closed position and provided with wedge means operable upon movement of said damper members to closed position to force said damper members into substantially tight engagement with one another and with fixed abutment means so as to provide a substantially gas tight seal.

A further object of the invention is to provide additional locking means operable to force said damper members, when in closed position, into still tighter engagement with one another and with said fixed abutment means so as to still further reduce the possibility of leakage of gas past said damper.

The damper of the present invention comprises, in general, two damper members so mounted as to counter-balance one another and each provided with baffle means preferably comprising a plurality of baffle plates with openings therebetween, and operating means for moving the respective damper members upwardly and downwardly and in opposite directions so as to bring the baffle plates on the respective damper members into or out of register with the openings on the other damper member. Said movable damper members may be operable in themselves to completely obstruct the passage in which they are mounted, when moved to closed position, or they may be adapted to cooperate with fixed baffle plates for this purpose. Fixed abutment means are preferably provided adjacent one of said damper members and at the opposite side thereof from the other damper member, and said other damper member is preferably provided with wedge means, the construction also comprising fixed wedge-engaging means in position to engage said first-named wedge means upon movement of the damper members to closed position and force said damper members relatively toward one another and toward said fixed abutment means for the purpose of providing a substantially gas tight seal. There are also preferably provided additional locking means operable to force said damper members into still tighter engagement with one another and with said fixed abutment means when said damper members are in closed position, for the purpose of providing a still more positive seal against leakage of gas past the damper.

Certain examples of damper constructions embodying this invention are illustrated in the accompanying drawings, and referring thereto:

Fig. 1 is a horizontal section of a form of damper according to this invention, in which the two movable damper members serve, in themselves, to provide complete closure or obstruction of the passage in which they are mounted, when in closed position, said section being taken on line 1—1 in Fig. 2.

Fig. 2 is a vertical section thereof on line 2—2 in Fig. 1.

Fig. 3 is a vertical section on line 3—3 in Fig. 2 with the damper members in closed position.

Fig. 4 is a section on line 4—4 in Fig. 2 with the damper members in open position.

Fig. 5 is an enlarged vertical section of the upper portion of the damper members and associated tightening mechanism, in the position shown in Fig. 3.

Fig. 6 is a detail horizontal section on line 6—6 in Fig. 5, showing the wedge means.

Fig. 7 is a detail horizontal section on line 7—7 in Fig. 5, showing a portion of the additional locking means.

Fig. 8 is a vertical section of part of the operating mechanism for the additional locking means, taken on line 8—8 in Fig. 5.

Fig. 9 is a horizontal section of a modified form of damper according to this invention in which fixed baffle means are provided, which cooperate with the baffle means of the respective damper members to provide complete closure or obstruction of the passage in which the damper is mounted.

Fig. 10 is a vertical section on line 10—10 in Fig. 9, showing the damper members in closed position.

Fig. 11 is a similar view showing the damper members in open position.

Figs. 12 and 13 are enlarged vertical sections of portions of the damper construction, with the damper members in the positions shown in Figs. 10 and 11 respectively.

In the drawings, the damper means controlling a flue or passage is shown as of duplicate construction comprising two damper sections of identical construction extending side by side. It will be understood that one, or any desired number of damper sections, may be used.

The form of damper shown in Figs. 1 to 8 inclusive, comprises two vertically disposed damper members 1 and 2 extending in parallelism and in proximity to one another transversely within a flue or gas passage 3 defined by side walls 4, top wall 5, and bottom walls 6. Said bottom walls are shown as sloping inwardly and downwardly so as to form a dust-receiving hopper below said flue or gas passage. Adjacent the position of the damper, and surrounding the opening to be controlled thereby, are provided fixed abutment means comprising side members 7 secured to the respective side walls 4, a top member 8 secured to a beam 9 extending across just beneath the top wall 5, and a bottom member 10 secured to a beam 11 extending across the lower edge of the gas passage. Said abutment members are provided with vertical sealing faces 7', 8' and 10' respectively at the side toward the damper members, all of said sealing faces being shown as disposed in a common vertical plane.

The dampers 1 and 2 are shown as each comprising a plurality of baffle members 13 and 14 respectively, extending vertically and spaced apart in the respective dampers so as to provide open spaces 15 and 16 therebetween. Each of said baffle members is formed of one or more metallic plates. In the construction illustrated the dampers are shown as provided at their outer vertical edges with vertical frame members 17 and 18 respectively and at their inner vertical edges with vertical frame members 19 and 20 respectively.

The vertical frame members 17 of the two sections of damper member 1 extend alongside the side abutment members 7 and are provided with bearing faces 17' adapted to engage the faces 7' of said abutment members, and additional fixed vertical abutment members 21 are also provided midway of the width of the gas passage having bearing faces 21' engaged by bearing faces 19' on the inner vertical frame members 19 of said two sections. Each damper member 1 and 2 is shown as further comprising a top horizontal frame member 23 and a bottom horizontal frame member 24 extending respectively above and below both sections of said damper member and secured to the vertical frame members 17 and 19 of both said sections so as to secure both of said sections rigidly together to form a single damper member. Said top and bottom frame members are provided with bearing faces 22' and 24' respectively, adapted to engage the bearing faces 8' and 10' respectively of the top and bottom fixed abutment members 8 and 10. The vertical plate baffle members 13 of each section of each damper member 1 and 2 are secured at their lateral edges to the outer and inner vertical frame members 17 and 19 respectively, and vertical spacer members 26 also secured to said frame members 17 and 19 are provided between the adjacent edges of adjacent baffle members. Said baffle members are shown as provided with horizontally disposed flanges 27 at their upper and lower edges and with vertically disposed flanges 28 at their lateral edges, said flanges 28 serving for connection thereof to the frame members 17 and 19, and the top and bottom flanges 27 abutting against, and being preferably secured to, web portions 29 on the spacing members 26.

Additional spacing and reenforcing members 31 are also preferably provided at the mid-length of the respective baffle members, and similar members 31' are also preferably provided between adjacent baffle members at the mid-length thereof for increasing the rigidity of the structure. The vertical distance from the upper edge of the uppermost baffle 13 to the lower edge of the lowermost baffle is approximately equal to the height of the opening between the fixed top and bottom members 8 and 10, and the top flange of the uppermost baffle member and the bottom flange of the lowermost baffle member are secured to the top damper frame member 23 and bottom damper frame member 24 respectively.

The damper members 1 and 2 are mounted on supporting means providing for vertical movement of said members in opposite directions, so as to effect the opening and closing of the apertures therein and so that said members mutually counter-balance one another in all positions of movement thereof. For this purpose a suspension bolt 35 extending upwardly from each of said members through an opening in the top of the flue 3 is connected to a chain or other flexible supporting member 36 running over a pulley 37 on a supporting shaft 38 which is mounted in bearings 39 on a frame 40 supported on the top frame beams 9. Operation of shaft 38 for control of the damper may be effected by any suitable means, for example by electric motor 41, whose shaft 42 is connected through reducing gearing 43 to the shafts 38 for the duplicate sets of damper members. Said motor is connected in the usual manner to any suitable energizing circuit including control means, whereby the damper operating mechanism may be operated in one direction or the other as desired.

To facilitate relative vertical movement of the damper members, it is desirable that the same should normally operate freely or with a loose engagement, and in order to tightly close the damper means it is desirable to provide means for forcing said damper members into tight engagement when they are brought to closed position. For this purpose wedges 45 may be provided on the damper member 2 adapted to engage fixed wedges 46 on brackets 34 and 47 mounted on vertical supporting frame members 32 and 33, so that as the damper member 2 descends to closed position the engagement of said wedges will force said damper member into close contact with the damper member 1. The brackets 34 at each side of the damper frame are shown as comprising plates secured to vertical frame members 32 extending alongside passage 3, and the brackets 47 at the mid-width of the damper are mounted on a frame column 33 extending back of the damper and supported on plates 33' secured to frame members 21 and extending between the damper sections. Each wedge 45 at the mid-width of the damper may be mounted as shown on a plate 45' connected to the frame members 20 of both of the damper sections 2 so as to rigidly connect said damper sections. To provide for adjustment of wedges 46, the same may be slidably mounted on bolts 46' on plates 34 and brackets 47 respectively, and adjusted by screws 44 on brackets 34' secured to plates 34 and on plates 47' secured to column 33. In some cases it is desirable to provide a tighter engagement than can be effected by such wedge means, and for this purpose I may provide supplementary tightening means comprising levers 48 supported, for example, on plates 34 on the side frame members 32 and provided with adjustable contact means, such as screws 49 (see Figs. 5 and 7), adapted to engage the damper member 2 at suitable points thereon to force the same against the damper member 1. Said levers 48 may be connected through arms 50 to an operating bar 51 which is connected to rod 52 pivoted at 53 to an operating cam 54 mounted on the top wall 5 of flue 3 and provided with an operating handle 55, said cam being provided with a wheel 56 pivotally mounted thereon at 57 and riding on a rail 58 mounted on top of flue 3, in such manner that as the lever is operated in one direction or the other, cam 54 in cooperation with rail 58 operates to raise or lower rod 52. In such operation pivots 53 and 57 pass dead center position with respect to the vertical direction of the force exerted thereon so that the tightening means will remain automatically in either position to which it is moved.

In the operation of the damper, assuming that the damper means is in the open position shown in Fig. 4, and it is desired to close the same, electric motor 41 is set in operation so as to rotate the shafts 38 in such manner that the damper members 2 are caused to descend and the damper members 1 are caused to rise until the respective baffle means 14 of the damper members 2 are brought opposite the openings 15 in the damper members 1 so as to shut off passage of gas through the damper. As the damper members approach such closed position, the wedges 45 on damper member 2 engage with fixed wedges 46 to force the damper member 2 toward and against the damper member 1 (which is held from displacement by abutment means 7, 8 and 10) to more effectively close the damper. If a still more effective closure is required, the same may be obtained by throwing over the operating handle 55 to the position shown in Fig. 5, thereby lifting the rod 52 and bar 51 and turning levers 48 so as to bring the contact means 49 thereon into engagement with the damper member 2 and force the same positively into tight contact with the damper member 1.

In case regulation or partial closure of the damper is required, the operation of the electric motor will be so controlled as to arrest the closing movement of the damper members to provide the desired amount of opening between the baffle means 13 and 14 thereof.

With the above described construction it is possible to obtain a total aperture area of approximately half the area of the damper. In case a greater amount of aperture is desired a construction such as shown in Figs. 9 to 13 may be employed. In this form of the invention the damper is composed of fixed damper plates or baffles 60 and movable damper members 61 and 62 provided with damper plates or baffles 63 and 64 respectively, said damper members 61 and 62 being mounted to move vertically in opposite directions so as to cause the respective damper plates or baffles to register with one another as shown in Figs. 11 and 13, thereby providing openings or apertures 66 therebetween, or to be brought out of register so as to close the openings as shown in Figs. 10 and 12.

The fixed damper plates or baffles 60 are shown as mounted on vertical frame members 68 extending alongside of the passage controlled by the damper, and the damper member 61 is provided with vertical flange means 69 adapted to ride on or adjacent to a vertical face 70 on said vertical bar 68 and with baffle plates 63 connecting said flange means and spaced apart to provide apertures. Bar 68 is mounted on side plates 71 at the respective sides of the flue or passage controlled by the damper and secured to the side walls 72 of the flue. Suitable frame means 81 and 82 are also provided at top and bottom of the damper, as in the form above described, the damper member 61 closing against frame means 81 at the top and against the lowermost fixed baffle 60 at the bottom. Damper member 61 is also provided with transverse bars 63' extending across between the side members 69 at the mid-height of the apertures between the respective baffle members 63, in order to close the space between fixed baffles 60 and baffle members 64 of damper member 62 when the damper is in closed position, as shown in Fig. 10.

Damper member 62 is provided with side rails or flange means 73 and with baffle plates 64 connecting said side rails and spaced apart to provide apertures. The two movable damper members 61 and 62 are connected together and supported by suitable means (not shown) such as above described in connection with the forms shown in Figs. 1 to 9, so as to provide for simultaneous vertical operation of the two damper members in opposite directions and for mutual counter-balance of same.

If desired, wedge means 79 may be provided on damper means 62 engaging with fixed wedge means 78 on brackets 80 attached to the side plate 71 aforesaid, so as to force the damper member 62 over and against the damper member 61 and at the same time force the damper member 61 against the fixed damper plates 60 when the parts are in closed position shown in Fig. 10.

It will be seen that by making the respective damper parts 60, 63 and 64 of equal width, the total aperture obtained when the damper is wide open may be made approximately equal to two-thirds of the total area of the damper.

The damper plates 60 may be provided with reenforcing members 85 similar to those above described. If desired, additional tightening means may be provided, comprising operating rods 86, contact levers 83, links 84 connecting said operating rods and contact levers, and means such as above described for operating said rods to cause the contact levers to bear on the outermost damper member so as to cause tightening of both of the movable damper members against the fixed damper member.

With either of the above described forms of my invention, the power required to operate the damper means is reduced to a minimum by reason of the mutual counter-balancing of the damper members. Furthermore, on account of the plurality of damper openings provided in each damper member, and also on account of the motion in opposition of the two damper members, the movement of the damper members required to produce a given total opening is reduced to a minimum, such movement being approximately equal to one-half of the height of one of the openings between adjacent baffle means.

I claim:

1. In combination with a gas passage, a damper comprising two vertical damper members extending transversely of said passage and in close proximity to one another, supporting means for said damper members providing for simultaneous vertical movement of same in opposite directions and for mutual counter-balance of said damper members in all positions of such movement thereof, said damper members being each provided with a plurality of baffle plates and with openings between said baffle plates so as to vary the total aperture of the damper on variation of relative position of the damper members, said damper members being so connected as to cause the same to move in opposite directions throughout their travel from an open position in which the openings in the two members are in alignment with one another and a closed position in which the baffle plates of each damper member fully obstruct the openings of the other damper member, and means for simultaneously moving said damper members in opposite directions between said open and closed positions.

2. A damper comprising two vertical damper members extending in proximity with one another, supporting means for said damper members providing for vertical movement of said members in opposite directions and for mutual counter-balance of said damper members, said damper members being each provided with a plurality of baffle plates and with openings between said baffle plates so as to vary the total aperture of the damper upon variation of the relative position of the damper members, means for operating said supporting means for the damper members to simultaneously operate said members in opposite directions, and means for forcing said damper members into close engagement with one another when the same are brought to position to close the damper aperture.

3. A damper comprising two vertical damper members extending in proximity with one another, supporting means for said damper members providing for vertical movement of said members in opposite directions and for mutual counter-balance of said damper members, said damper members being each provided with a plurality of baffle plates and with openings between said baffle plates so as to vary the total aperture of the damper upon variation of the relative position of the damper members, means for operating said supporting means for the damper members to simultaneously operate said members in opposite directions, fixed wedge means, and wedge means mounted on one of said damper members and adapted to engage said fixed wedge means to force the damper members into tight engagement with one another when the damper is in closed position.

4. A damper comprising two vertical damper members extending in proximity with one another, supporting means for said damper members providing for vertical movement of said members in opposite directions and for mutual counter-balance of said damper members, said damper members being each provided with a plurality of baffle plates and with openings between said baffle plates so as to vary the total aperture of the damper upon variation of the relative position of the damper members, means for operating said supporting means for the damper members to simultaneously operate said members in opposite directions, and manually operated means for engaging one of the movable damper members to force the same into tight engagement with the other damper member.

5. A damper comprising two vertical parallel damper members extending in proximity to one another, a supporting shaft, flexible means mounted on said shaft to support said damper members in counter-balancing relation and to move said damper members vertically in opposite directions by rotation of said shaft, said damper members being each provided with a plurality of baffle plates with intervening openings so as to vary the total aperture of the damper in the relative vertical movement of the damper members.

6. A construction as set forth in claim 5 and comprising, in addition, means for rotating said supporting shaft.

CHARLES H. WEISKOPF.